Feb. 5, 1924.

W. A. REINHARDT 1,483,045

TUBULAR STUD

Filed Aug. 28, 1922

Inventor
Wm. A. Reinhardt.
Geo Stevens.
Attorney

Patented Feb. 5, 1924.

1,483,045

UNITED STATES PATENT OFFICE.

WILLIAM A. REINHARDT, OF ASHLAND, WISCONSIN.

TUBULAR STUD.

Application filed August 28, 1922. Serial No. 584,739.

*To all whom it may concern:*

Be it known that I, WILLIAM A. REINHARDT, a citizen of the United States, residing at Ashland, in the county of Ashland and State of Wisconsin, have invented certain new and useful Improvements in Tubular Studs, of which the following is a specification, reference being had therein to the accompanying drawing.

This invention relates to tubular metal studs, particularly adapted for use in connection with electric conduits, the terminals of which occur within an outlet box; the stud being used as an axial support within the box for the chandelier, or other extension from the box.

While the invention as here illustrated is thus cooperatively associated, it is obvious that the same may be effectually used in other ways and combinations, such, for example, as a terminal through a metal wall, or the like, for a single conduit.

The principal object of the invention is to provide a simple and inexpensive form of stud that may be quickly and securely applied to a box or other associated part.

Another object is to provide a stud of this character which may be applied without the necessity of the use of other parts than the stud itself.

Other objects and advantages of the device will appear in the further description thereof.

Referring to the accompanying drawings.

Figure 1:
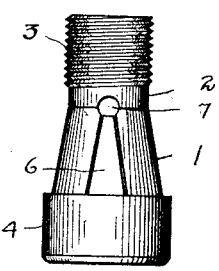
Figure 1 is a side elevation of one of my improved studs.

The stud proper comprises a tubular member, the principal body portion 1 of which is slightly tapered, terminating at one end in a smaller reduced cylindrical portion 2, which is preferably externally screw threaded at 3, while the opposite end terminates in a larger cylindrical portion 4 which is preferably internally screw threaded as at 5.

In the forming of one of these studs there are stamped out, upon opposite sides of the body portion 1, two clinching tongues 6, they being left preferably parallel with the terminations of the plug and are of tapered or wedge like form, their severed edge walls being parallel with the side walls of the body portion 1 when formed; the hole shown at 7 being simply for convenience in forming same and for the insertion of a tapered or sharpened tool, such as a screw driver, drift, or the like, for bending the tongues downwardly against the surface of whatever the stud may be applied to, for example the head 8 of the outlet box 9.

The body portion 1 of the stud is made tapered so that it may be forced tightly into the hole in the box or whatever device it may be applied to, thus obviating the necessity of the stud being made to perfectly fit within the hole.

When one of these studs is forced into a hole, as previously described, and the clinching tongues bent outwardly and downwardly tightly against the transverse wall of the hole, it is obvious that the stud becomes securely attached thereto; and in the event of being applied to an outlet box as shown, the tongues will extend radially from the axial hole across the box, adjacent the nuts 10 of the conduit pipes which extend within the box, thus rendering it impossible for the stud being accidentally turned, for example, by a too strenuous screwing up of the fixture on the end of the stud, as the clinching tongues 6 will engage the nuts 10, thus preventing the rotation of the stud.

To those versed in the art it is known that a sort of crow-foot bracket is ordinarily used within the outlet box, the same being fastened with four bolts in the holes 11 through the head of the box, and in comparison to this form of attachment the advantages of my improved stud are very evident.

Figure 2:
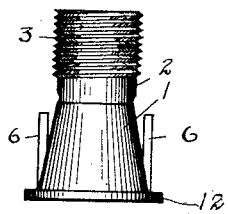
Figure 2 is a similar view, taken at right angles to Figure 1, of a slightly modified form of stud.
Figure 3:
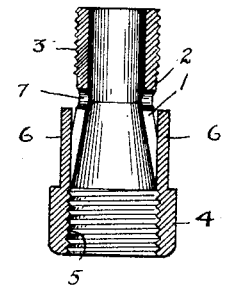
Figure 3 is a central vertical section of Figure 1 through the clinching members of the stud.
Figure 4:
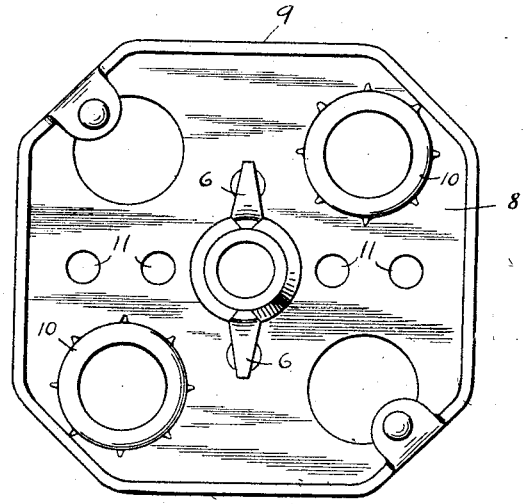
Figure 4 is an interior plan view of an electric conduit outlet box showing the relative position of one of the improved studs when applied thereto.

It is also apparent that the terminals of the stud may be formed in various ways, and screw threaded internally or externally as desired, or in some cases the larger end of the plug may simply be flanged as at 12, shown in the modified form, Figure 2, when the stud may be used as a hickey on a single electric line or conduit, and the wires of the line separated within the stud and carried out laterally through the openings forming by the bending away of the clinching tongues 6.

Having thus described my invention, what I claim as new and desire to secure by Letters Patent, is:

1. A stud of the character described having a tapered body portion, an annular projection about the base of the tapered portion, and opposed clinching tongues formed within the tapered portion for engaging a support between the annular projection and the tongues.

2. The combination with an outlet box having a hole therein, of a tubular plug for said hole, said plug having a centrally tapered body portion, a circumferential shoulder about the base of said body portion for engagement with the circumferential edge of the hole upon one side of the outlet box, and opposed clinching tongues formed within said tapered portion for engagement with the opposite side of the outlet box.

3. A stud of the class described being internally screw threaded at one end and externally screw threaded at the opposite end, a tapered body portion intermediate of the two screw threaded portions, an annular shoulder at the juncture of the tapered portion and the internally screw threaded portion, and opposed clinching tongues formed in the side walls of the tapered portion extending normally parallel with the side walls of the termini of the stud, substantially as and for the purpose described.

In testimony whereof I hereunto affix my signature in the presence of two witnesses.

WILLIAM A. REINHARDT.

Witnesses:
S. C. BRONSON,
S. GEO. STEVENS.